(12) United States Patent
Wenski et al.

(10) Patent No.: US 6,181,861 B1
(45) Date of Patent: Jan. 30, 2001

(54) ARRANGEMENT FOR BRANCHING A TELECOMMUNICATIONS CABLE CONTAINING SEVERAL STRANDED ELEMENTS WITH OPTICAL FIBERS

(75) Inventors: Wolfgang Wenski, Rinteln; Wolfgang Teschner, Wunstorf; Franz Grajewski; Werner Stieb, both of Stadthagen; Hans-Holger Freckmann, Langenhagen; Zbigniew Wielgolaski, Stadthagen, all of (DE)

(73) Assignee: Alcatel

( * ) Notice: Under 35 U.S.C. 154(b), the term of this patent shall be extended for 0 days.

(21) Appl. No.: 09/021,217

(22) Filed: Feb. 10, 1998

(30) Foreign Application Priority Data

| Feb. 14, 1997 | (DE) | 197 05 648 |
| Feb. 14, 1997 | (DE) | 197 05 649 |
| Jul. 12, 1997 | (DE) | 297 12 349 U |

(51) Int. Cl.⁷ ...................................................... G02B 6/00
(52) U.S. Cl. .............................................. 385/135; 385/100
(58) Field of Search ................................. 385/53–56, 100, 385/105–107, 134–137, 58, 51, 139

(56) References Cited

U.S. PATENT DOCUMENTS

| 4,884,863 | * | 12/1989 | Throckmorton | 385/135 |
| 4,900,123 | * | 2/1990 | Barlow et al. | 385/53 |
| 4,913,522 | * | 4/1990 | Nolf et al. | 385/135 |
| 5,204,933 | * | 4/1993 | Marx | 385/53 |
| 5,274,731 | * | 12/1993 | White | 385/135 |
| 5,546,495 | * | 8/1996 | Bruckner et al. | 385/135 |
| 5,596,670 | * | 1/1997 | Debortoli et al. | 385/135 |
| 5,708,751 | * | 1/1998 | Mattei | 385/135 |
| 5,754,723 | * | 5/1998 | Fremgen | 385/135 |

* cited by examiner

Primary Examiner—John D. Lee
Assistant Examiner—Michelle R. Connelly-Cushwa
(74) Attorney, Agent, or Firm—Ware, Fressola, Van der Sluys & Adolphson LLP

(57) ABSTRACT

In an arrangement for producing a branch in a telecommunications cable (1) containing several stranded elements with optical fibers, at least one stranded element is cut, the optical fibers of the stranded element are spliced to the optical fibers of a branch line (2), and the branched area is protected with a sleeve (3). The branch line (2) comprises a number of optical fibers, each of which is loosely arranged by itself in a small plastic tube (10). A predetermined length of the tube (10) is removed from approximately the middle of the optical fiber elements, and each optical fiber (13) from which the tube (10) has been removed is stored in a cassette (12). The cassettes (12) are stored in a container (5). The sleeve housing (4) is stored in a container (5). The sleeve housing (4) with the cassettes (12) and the branch line (2) with the optical fibers (13) located in the tube (10) are a unit which is prefabricated at the factory.

23 Claims, 4 Drawing Sheets

ARRANGEMENT FOR BRANCHING A TELECOMMUNICATIONS CABLE CONTAINING SEVERAL STRANDED ELEMENTS WITH OPTICAL FIBERS

BACKGROUND OF THE INVENTION

1. Technical Field

The invention concerns an arrangement for branching a telecommunications cable containing several stranded elements with optical fibers, where at least one stranded element is cut, the optical fibers of the stranded element are spliced to the optical fibers of a branch line, and the branched area is protected with a sleeve.

2. Description of the Prior Art

Most of the existing fiber-optic networks of telecommunication companies comprise point-to-point connections insofar as access to the individual optical fibers is not required. However, new offerers in the telecommunications market such as e.g. supply enterprises, railroad companies, municipal utilities etc. need to access the individual optical fibers because at the time the cables are laid it is not known when and where another subscriber must be connected after the cables have been installed. The possibility of obtaining access to an individual optical fiber after the cable installation must therefore be provided, without impairing any other active optical fiber i.e. one via which information is already being transmitted.

The architecture of such networks is normally an annular structure which needs not necessarily to be a closed one. This means that the optical fibers are looped at or in the vicinity of the subscriber.

The Raychem Company has developed a sleeve for access to the individual optical fibers which can be obtained in the market under the trade name FIST.

In a first application of this sleeve, the cable is cut, a predetermined length of the cable jacket and any central strength element, if present, is removed and the optical fibers of both cables as well as the cable ends are inserted through openings in the bottom part of the sleeve which has the shape of a hooded sleeve. The optical fibers are spliced to each other and are individually placed into cassettes. If one or several subscribers must already be connected when the sleeve is being produced, the optical fibers provided for the connection are spliced to the optical fibers of the subscriber cable. The cables that were inserted through the bottom part are permanently sealed inside the openings.

According to another solution, a predetermined length of the jacket and the central element are removed and the uncut optical fibers are inserted through an oval opening in the bottom part of the hooded sleeve. This requires bending the optical fibers which can cause a breakage of the sensitive optical fibers. In this case as well, the excess lengths of the individual optical fibers are placed into separate cassettes.

Both solutions require that each bared optical fiber must be threaded through a small plastic tube at the installation site to protect it against mechanical damage. This is a time-consuming operation which makes the production of a sleeve at the installation site considerably more expensive. Another disadvantage of these sleeves is that they can only be incorporated during the initial installation, a subsequent incorporation is not possible.

SUMMARY OF THE INVENTION

The object of the present invention is to present an arrangement for producing a branch in an optical telecommunications cable, which can be accomplished in a significantly shorter time, and which can also be installed into an already installed optical telecommunications cable. It is significant in this case that each individual fiber or each individual optical fiber of the branched part of the cable can be accessed in the sleeve.

The essence of the invention is that a first sleeve is provided which encloses a branch connection for at least one stranded element. This first sleeve is a conventional sleeve with a number of splice supports for the spliced optical fibers, such as are known e.g. from EP 0 490 133 A (equivalent to U.S. Pat. No. 5,204,938). This sleeve does not need to be reopened and can therefore be laid underground for protection.

The second sleeve is a sleeve which is prefabricated at the factory and is designed to be opened at any time. The sleeve encloses a number of easily accessible cassettes. Each cassette contains a predetermined slack length of an optical fiber. On the outside of the cassette, the ends of the optical fibers are inserted into a small plastic tube. Several of such small plastic tubes are bundled together and a number of such bundles pass through a plastic conduit. The cited elements are prefabricated into a unit so that only the individual optical fibers must be connected by means of conventional splicing to the corresponding optical fibers of the branched stranded elements, and 8 to 12 splices are stored in a cassette. The length of the optical fibers with small plastic tubes which protrude from the sleeve is long enough so that the sleeve can be located at a corresponding distance from the cable. The second sleeve, this is a hooded sleeve as a rule, can be stored in a container made of concrete for example.

A length of about 2.5 m of the "cable" comprising the plastic conduit with the bundles is stored in the container so that the sleeve can be removed from the container for the purpose of connecting a new subscriber.

The invention will be fully understood when reference is made to the following detailed description taken in conjunction with the accompanying drawings.

DETAILED DESCRIPTION OF THE INVENTION

Figure 1:
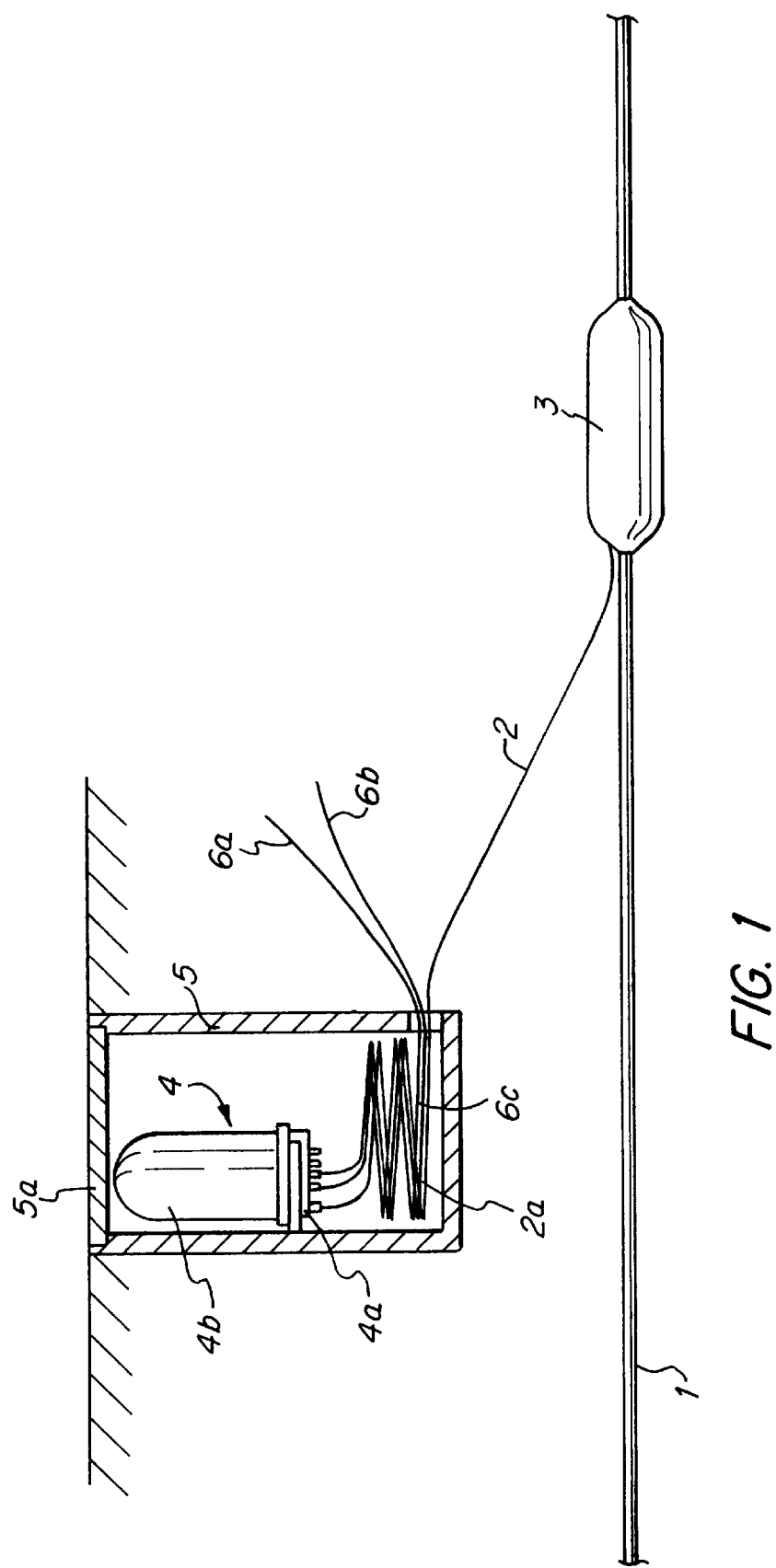
FIG. 1 is a side elevational view in partial section of an arrangement for branching a telecommunication cable.

FIG. 1 illustrates a principal cable 1, usually a standard cable with 144 fibers, from which a portion of the fibers, e.g. 24 or 48, are to be branched off. This branch can either be installed between two cable lengths of two to three kilometers each during the cable laying, or in shorter lengths to an already installed cable. In both of the cases cited first, the unbranched fibers are spliced, and 8 to 12 splices are stored in a cassette. The fibers to be branched off are spliced to the fibers of a branch channel 2. The branch area is subsequently protected with a sleeve 3. This sleeve 3 needs not to be reopened as a rule. For that reason a sleeve such as is known e.g. from EP 0 490 133 A can be used.

In a case cited in third place, the principal cable 1 is bared, a predetermined length of the sheath is removed, the fibers to be branched off are bared and spliced by means of conventional splicing to the fibers of the branch cable 2. As mentioned in the cases cited first, the branch area is subsequently protected with the sleeve 3 and buried.

The branch cable 2 is a plastic conduit in which several bundles of individual small plastic tubes are stored. Each plastic tube contains an uncut optical fiber. The branch cable 2 is inserted through the bottom part 4a of a hooded sleeve 4 with a removable hood 4b, and is sealed. All the openings in the bottom part 4a are circular openings to prevent the problems which can occur when oval openings are sealed. The inside of the hooded sleeve 4 has a number of cassettes (e.g., see FIGS. 2–5), each of which is separately accessible.

The hooded sleeve 4 is separated from the branch sleeve 3 in an underground container 5, which is equipped with a removable but preferably lockable cover 5a.

One or more windings 2a of the branch cable 2 are stored in the bottom of the underground container 5 so that the hooded sleeve 4 can be taken out of the container 5 for the purpose of an installation.

The branch cable 2 and the hooded sleeve 4 form a unit which is prefabricated at the factory. For example if two new subscribers are being connected to the principal cable 1 or the network, the optical fibers of the subscriber cables 6a and 6b are connected to the corresponding optical fibers in the hooded sleeve 4. Several windings of the subscriber cables 6a and 6b are also stored as slack lengths 6c in the bottom of the container 5. Since both the branch cable 2, because of the missing central strength element and other tension relief elements, as well as the subscriber cables 6a and 6b because of their small diameter, are extremely flexible, the winding diameters of the slack lengths 6c and 2a are also very small. The result is an extremely low cost of the container 5 and its installation.

For example, if two new subscribers are being connected to the network, the cover 5a is taken off, the hooded sleeve 4 is removed, the sleeve 4b is detached and the desired cassettes become accessible. The subscriber cables 6a, 6b can be attached to the desired fiber by means of known splicing techniques. The subscriber cables 6a, 6b which exit through the bottom 4a are sealed with respect to the bottom 4a. In the same way, the cable 2 is sealed with respect to the bottom opening 4a. The sealing presents no difficulties since all the openings in the bottom 4a are circular and the incoming and outgoing cables 2, 6a, 6b are also circular.

In a cable 1 for the cited purpose, the number of optical fibers is e.g. 144, in some cases up to 192. Twelve each optical fibers are combined in a stranded element. One stranded element is e.g. a small plastic tube in which the 12 optical fibers are stored. One optical fiber and one cassette are provided in the hooded sleeve 4 for each optical fiber of the element to be branched off. In the hooded sleeve 4, which is prefabricated at the factory, an optical fiber is encased in a small plastic tube with an outside diameter of e.g. 0.9 mm. Lengths of about 15 m are detached from an element produced in this manner. About 2.5 m of the small plastic tube is removed from the center of such a length. The bared length of the optical fiber is stored in a cassette and the ends of the small plastic tube are attached to the inlet of the cassette. Several, e.g. 2×12, of such cassettes are prepared. The small plastic tubes protruding from the cassettes are formed into two bundles and different color tapes are wrapped around them. The two bundles are inserted into a corrugated plastic conduit which passes through an opening in the bottom part 4b of the hooded sleeve 4 and is sealed. The cassettes are stacked and the hood 4b is connected to the bottom part 4a in a waterproof manner. The space between the bundles and the corrugated plastic conduit is sealed in the usual cable technology manner to prevent lengthwise water propagation.

Figure 2:
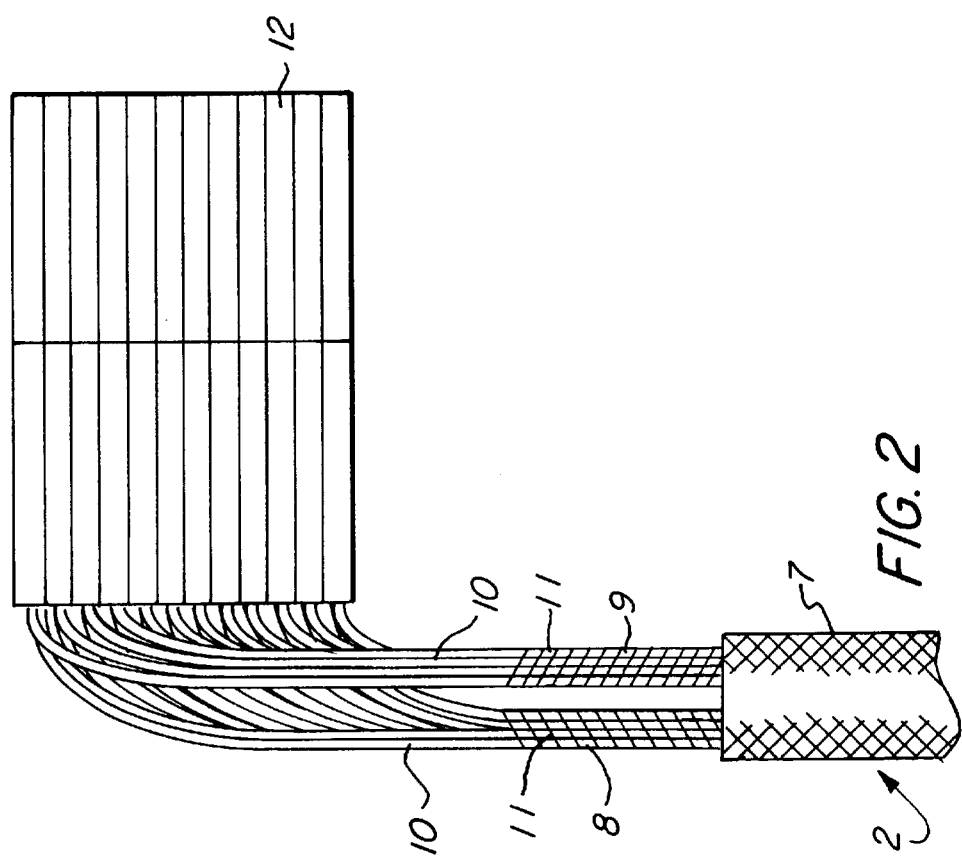
FIG. 2 is a side elevational view of a stack of cassettes with a branch cable extending therefrom.

FIG. 2 illustrates the branch cable 2 with its plastic conduit 7, preferably a corrugated plastic conduit, and bundles 8 and 9. Each bundle 8, 9 comprises several small plastic casings or tubes 10, which are held together by a thread or a tape 11. The threads or tapes 11 have different colors for the purpose of identifying the bundles 8 and 9. Each one of the individual small plastic tubes 10 is inserted and exits from a cassette 12, i.e. each cassette 12 contains an optical fiber with a predetermined slack length. The cassettes 12 form a stack which is stored in the hooded sleeve 4. Each cassette 12 can be accessed separately so that a new connection can be established without interfering with other subscribers.

Figure 3:
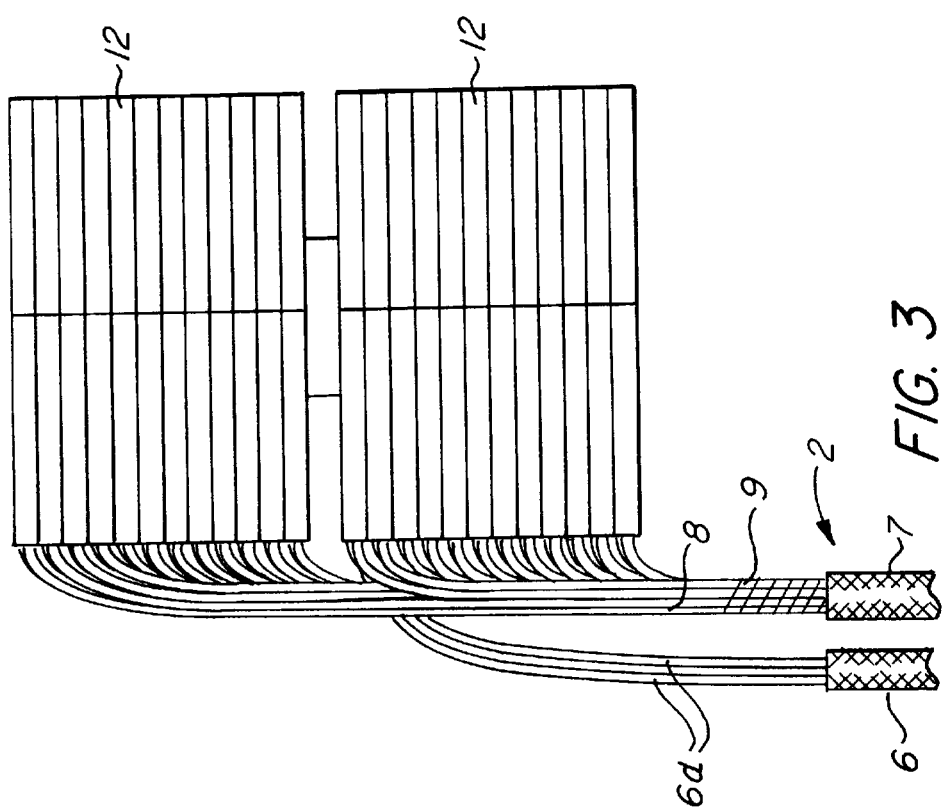
FIG. 3 is a side elevational view similar to FIG. 2 but with a larger number of cassettes.

FIG. 3 illustrates a stack comprising a larger number of cassettes 12. Beyond that FIG. 3 shows that the conductors 6d of a subscriber cable 6 are connected to the optical fibers.

Figure 4:
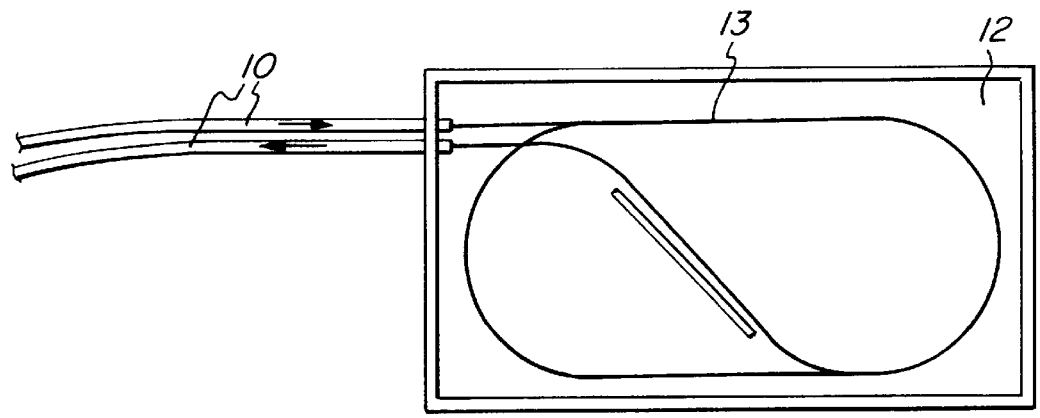
FIG. 4 is a top plan view of a cassette with a portion broken away to reveal internal structure.

FIG. 4 illustrates a cassette 12 into which the small plastic tube 10 is inserted and from which it exits. The optical fiber 13 lies loosely inside the cassette 12 and touches its inner periphery. The slack length of the optical fiber 13 inside the cassette 12 is about 2.5 m.

To produce the unit comprising the cassette 12, the small plastic tube 10 and the optical fiber 13, first a length of about 15 m of a small plastic tube 10 containing an optical fiber 13 is cut from a slack length at the factory. In the center of the 15 m length the small plastic tube 10 is removed from a length of 2.5 m and the bared optical fiber 13 is placed into the cassette 12.

The individual incoming and outgoing small plastic tubes 10 are then combined into bundles 8 and 9 at the factory and wrapped with the tapes or threads 11 and inserted into the corrugated plastic tube 7. The space between the bundles 8 and 9 and the corrugated plastic tube 7 is sealed in accordance with cable technology to prevent lengthwise water propagation. The corrugated plastic tube 7 is then inserted into an opening in the bottom part 4a of the hooded sleeve 4 where it is sealed. The hood 4b is mounted after the cassettes 12 are stored in the not illustrated frame of the hooded sleeve 4. In this way, the prefabricated sleeve with cassettes 12, each of which contains an optical fiber 13, is ready for use.

Figure 5:
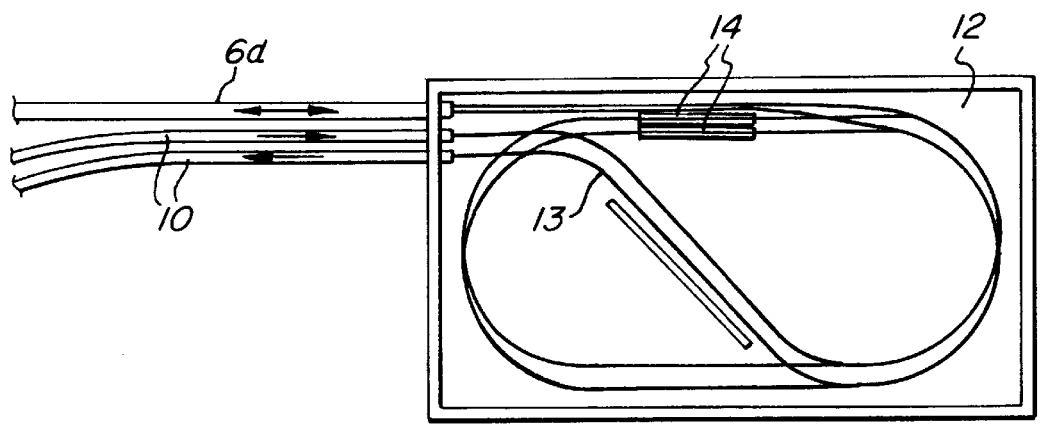
FIG. 5 is a top plan view similar to FIG. 4 but showing a different internal structure.

FIG. 5 illustrates a cassette 12 in which a conductor 6d of a subscriber cable 6 with its optical fiber is spliced to the optical fiber 13 by means of a splice reinforcement tube 14.

Figure 6:
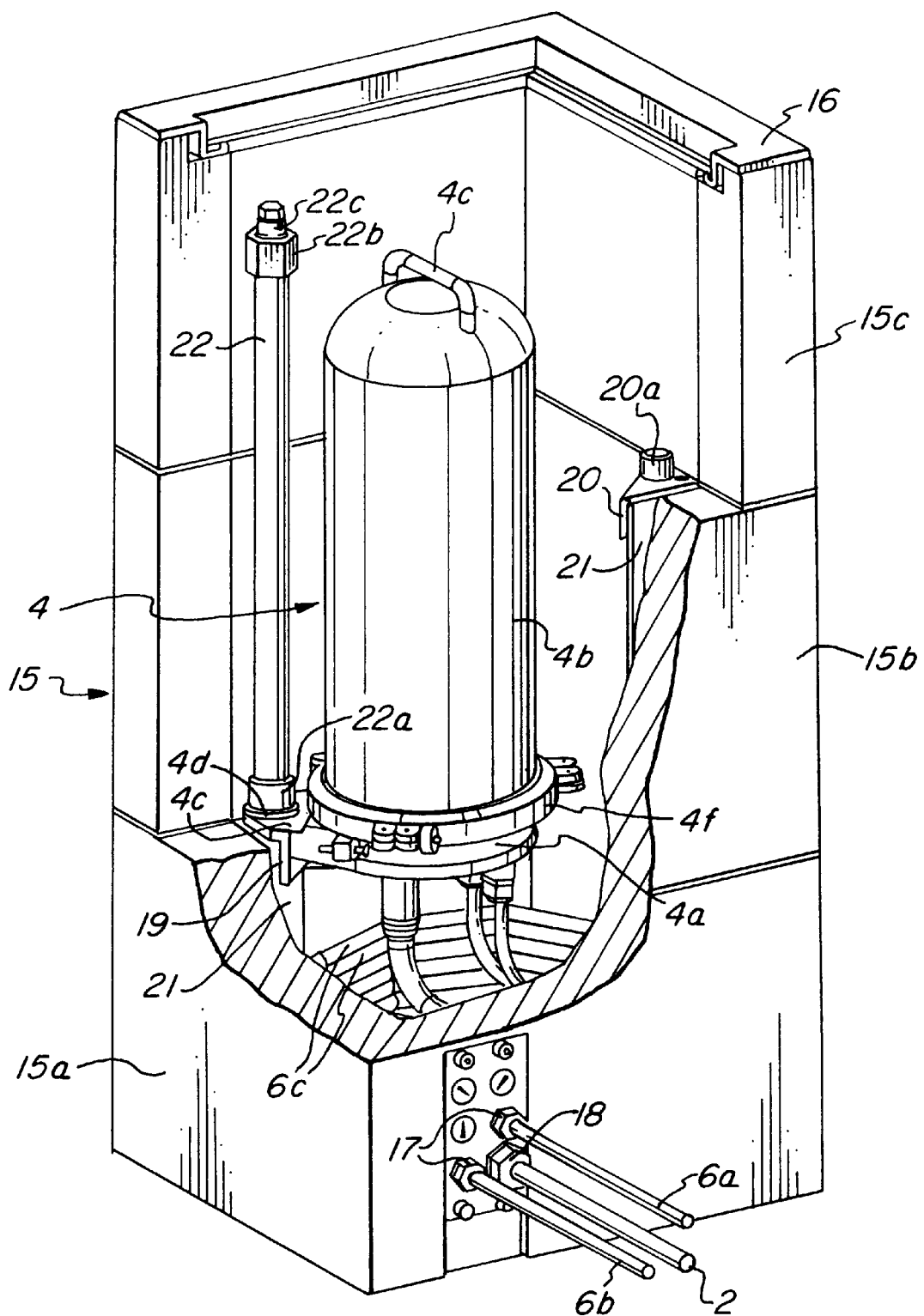
FIG. 6 is a perspective view of the container in the arrangement for branching the telecommunication cable with a portion broken away to reveal internal structure.

FIG. 6 illustrates an underground container with a sleeve housing stored therein.

The underground container comprises an external housing 15 made of concrete e.g., which is constructed of a tub-shaped bottom part 15a and several segments 15b and 15c placed on the bottom part 15a. A cover 16 made of cast iron e.g., is placed on the segment 15c.

The incoming and outgoing cables 2 and 6a, 6b, preferably optical fiber cables, are inserted into the bottom part 15a through unnumbered bores, and are secured with cable bolts 17 and 18 and sealed.

The bottom part 4a of the sleeve 4 has a shoulder 4c with a bore 4d provided therein.

Two holders 19 and 20 are attached to the inside wall of the container 15 at opposite sides and different heights. They are placed on and bolted to supports 21. Each of the holders 19 and 20 has a stem (only stem 20a is illustrated).

In the normal condition, the sleeve 4 rests on the holder 19. To that end, the stem 19 passes through the bore 4d. The sleeve 4 is secured with a rod 22 which has a bushing 22a at its lower end, making a tightly fitting connection between the stem 19a and the bushing 22a, e.g. by bolting or by means of a bayonet fastener. The rod 22 has a hexagon 22b at its upper end to facilitate the attachment or the removal of the connection.

In the event installation work must be provided on the sleeve 4, the connection between the rod 22 and the holder 19 is loosened by rotating the rod 22, the sleeve 4 is taken out of the housing 15 by rotating the sleeve 4 counter to the direction of the windings 6c.

The rod 22 with its bushing 22a is placed on the higher holder 20 where it is secured. The shoulder 4c or the bore 4d of the sleeve 4 is placed on the cylindrical end 22c of the rod 22 where it is secured in a manner known per se. The sleeve 4 has a handle or a grip 4e to facilitate its removal.

By loosening the tension strap 4f which connects and pressure-proofs the bottom part 4a and the hood 4b, the hood 4b can be removed to make the cassettes 12 (FIGS. 2 and 3) therein accessible.

After the installation work is completed, the hood 4b is placed on the bottom part 4a and the tension strap 4f is laid around it and tightened. After that the rod 22 is loosened from the holder 20, the sleeve 4 is raised and lowered into the inside of the housing while it is rotated in the direction of the cable windings 6c, and placed on the lower holder 19. Finally, the rod 22 is secured.

At the end, the cover 16 is placed on the housing 15.

The preferred embodiment described above admirably achieves the objects of the invention. However, it will be appreciated that departures can be made by those skilled in the art without departing from the spirit and scope of the invention which is limited only by the following claims.

What is claimed is:

1. An arrangement for connecting to a main cable containing several stranded elements, each with a plurality of optical fibers therin, comprising:
   (a) a housing;
   (b) at least two splice cassettes in the housing; and
   (c) a branch-off cable entering the housing in a fluid tight manner and having at least two optical fibers adapted for splicing to the optical fibers of the main cable to create a branched area to be protected to a sleeve, the sleeve for the branched area is buried undergound, each optical fiber protected by a separate pair of tubes made of polymeric material, a portion of each optical fiber not located within its pair of tubes and being stored in a respective one of the at least two splice cassettes in the housing thereby acting as excess length being adapted to be connected to a subscriber connection cable, wherein the branch-off cable and the housing with the cassettes comprise a prefabricated unit.

2. An arrangement as claimed in claim 1, wherein several of the pairs of tubes with optical fibers therein are combined into a bundle.

3. An arrangement as claimed in claim 2, wherein each bundle is helically wrapped with a tape or thread.

4. An arrangement as claimed in claim 3, wherein the tapes or threads are of different colors to identify the bundles.

5. An arrangement as claimed in claim 2, wherein each bundle is surrounded by a protective conduit.

6. An arrangement as claimed in claim 5, wherein the protective conduit is a corrugated plastic conduit.

7. An arrangement as claimed in claim 5, wherein a gap between each bundle and its protective conduit is sealed against lengthwise water propagation.

8. An arrangement as claimed in claim 5, wherein the protective conduit is at least 5 m in length.

9. An arrangement as claimed in claim 5, wherein the housing is a hooded sleeve with several openings in a bottom part, one of the openings contains the protective conduit, and other of the openings are provided to insert subscriber connection cables.

10. An arrangement as claimed in claim 9, wherein the openings in the bottom part of the housing have a circular cross section.

11. An arrangement as claimed in claim 1, further including a container in which the housing is stored, the container is an underground container.

12. An arrangement as claimed in claim 1, wherein the housing is prefabricated so that ends of the optical fibers of the branch-off cable can be connected by means of conventional splicing to the optical fibers to be branched off from the main cable.

13. An arrangement as claimed in claim 1, wherein the portion of each optical fiber is stored as an uncut slack length in its cassette.

14. An arrangement as claimed in claim 1, wherein the optical fiber of the branch-off cable protruding from the housing is at least 5 m in length.

15. An arrangement as claimed in claim 1, wherein each optical fiber of the branch-off cable has a length in a range of about 10 to 15 m and each tube in its respective pair of tubes has a length in a range of 4 to 6 m.

16. An arrangement as claimed in claim 1, wherein each pair of tubes enters its respective one of the at least two splice cassettes thereby protecting its optical fiber.

17. An arrangement for branching a telecommunications cable containing several stranded elements, each with a plurality of optical fibers therein, comprising: at least one stranded element being cut, the optical fibers of the stranded element are spliced to optical fibers of a branch line to create a branched area which is protected with a sleeve, each optical fiber of the branch line is arranged in a pair of casings so that a portion of the optical fiber is not contained therein, the portion of the optical fiber is stored in a cassette, the cassettes are located in a sleeve housing which can be opened, and the sleeve housing is located in a container, wherein the container includes:
   a) upper and lower holders provided on opposite sides of an inside wall of the container and at different levels;
   b) the sleeve housing attached to the lower holder by a bottom part; and
   c) the sleeve housing is secured with a rod, one end of which is screwed to the holder.

18. An arrangement as claimed in claim 17, wherein the rod has a turning aid at an end opposite from the lower holder.

19. An arrangement as claimed in claim 18, wherein the turning aid is chosen from a group consisting of a square on an external surface of the rod, a hexagon on an external surface of the rod, a square on a front end of the rod, a hexagon on a front end of the rod, and a transverse bore.

20. An arrangement as claimed in claim 17, wherein the sleeve housing is a hooded sleeve.

21. An arrangement as claimed in claim 20, wherein a handle is provided at an end of the hooded sleeve which faces away from the bottom part.

22. An arrangement as claimed in claim 17, wherein the holders are bolted to supports.

23. An arrangement as claimed in claim 17, wherein the container is made of concrete and comprises several superimposed segments.

* * * * *

UNITED STATES PATENT AND TRADEMARK OFFICE
CERTIFICATE OF CORRECTION

PATENT NO. : 6,181,861
DATED : January 30, 2001
INVENTOR(S) : Wolfgang Wenski et al.

It is certified that error appears in the above-identified patent and that said Letters Patent is hereby corrected as shown below:

In column 2, line 12, "5,204,938" should be --5,204,933--.

In column 5, line 36 (claim 1, line 3), "therin" should be --therein--.

In column 5, line 42 (claim 1, line 9), "to" should be --by--.

Signed and Sealed this

Twenty-ninth Day of May, 2001

Attest:

NICHOLAS P. GODICI

Attesting Officer

Acting Director of the United States Patent and Trademark Office